United States Patent

Harwell et al.

[11] Patent Number: 5,966,489
[45] Date of Patent: *Oct. 12, 1999

[54] FIBER OPTIC RIBBON INTERCONNECT CABLE

[75] Inventors: Shannon N. Harwell, Hickory; Daniel J. Rutterman, Hudson, both of N.C.

[73] Assignee: Siecor Corporation, Hickory, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/884,934

[22] Filed: Jun. 30, 1997

[51] Int. Cl.$^6$ ................................................ G02B 6/44
[52] U.S. Cl. .......................................................... 385/114
[58] Field of Search ................................. 385/114, 109, 385/141

[56] References Cited

U.S. PATENT DOCUMENTS

| | | | |
|---|---|---|---|
| 4,147,407 | 4/1979 | Eichenbaum et al. | 385/141 |
| 4,893,893 | 1/1990 | Claxton | 350/96.23 |
| 4,900,126 | 2/1990 | Jackson et al. | 385/114 |
| 5,136,683 | 8/1992 | Aoki et al. | 385/141 |
| 5,208,889 | 5/1993 | Cedrone et al. | 385/114 |

FOREIGN PATENT DOCUMENTS

| | | | |
|---|---|---|---|
| 0762171A1 | 3/1997 | European Pat. Off. | G02B 6/44 |
| 3606626 | 9/1987 | Germany | 385/109 |
| 1-138519 | 5/1989 | Japan | 385/114 |
| 01245205 | 9/1989 | Japan | G02B 6/44 |
| 2-56510 | 2/1990 | Japan | 385/114 |

OTHER PUBLICATIONS

IBM Technical Disclosure Bulletin, vol. 39 No. Jan. 1, 1996; "Parallel Optical Fiber Cable for Optical Transceivers with a Gap Between Groups of Fibers Within the Cable," pp. 321–322.

*Primary Examiner*—John D. Lee
*Assistant Examiner*—Juliana K. Kang
*Attorney, Agent, or Firm*—Timothy J. Aberle

[57] ABSTRACT

An optical cable (50) for use in a fiber optic cable assembly (10). Fiber optic cable assembly (10) comprises conventional single fiber connectors (80,82), a dual fiber connector (84), and a connector fan-out housing (86). Dual fiber connector (84) is of the type used to interface with, for example, an opto-electrical and electro-optical transducer. Fiber optic cable (50) comprises a ribbon (20). Ribbon (20) includes optical fibers (24), a variable spacing section (23), and a transition section (27) inside connector housing (86). Optical fibers (24) are spaced at a nominal fiber-to-fiber distance, defined as spacing S, in cable section (21). Variable spacing section (23) comprises sub-carrier sections (22a, 22b) comprising plastic tubes, e.g. furcation tubing, the spacing of which is variable. Spacing S matches the spacing needed in an electrical system to avoid crosstalk.

27 Claims, 4 Drawing Sheets

FIBER OPTIC RIBBON INTERCONNECT CABLE

The present invention relates to a fiber optic cable for use in a cable assembly comprising fiber optic connectors connectorized to a ribbon in the cable.

BACKGROUND OF THE INVENTION

Electrical and fiber optic components are used to transmit data signals in telecommunication, computer, and closed circuit television systems. Conventional components, for example, opto-electrical and electro-optical transducers, are used in such systems to interface between electrical and fiber optic modes of signal transmission. Electrical systems, however, may experience crosstalk between the signal wires thereof. This type of electrical crosstalk occurs due to electromagnetic fields surrounding the transmitting wires. The electromagnetic fields due to one given circuit induce currents and electromotive forces in other circuits spaced close enough to the disturbing electrical circuit to be affected. For example, electrical crosstalk affecting a telephone line may result in the undesired mixing of caller conversations over the affected line. Spacing the electrical wires of different circuits apart tends to reduce electrical crosstalk. On the other hand, because optical-based systems use confined light as the information carrying medium rather than electricity, optical-based systems are not as susceptible to crosstalk and therefore do not require a significant crosstalk type spacing between the optical fibers.

Opto-electrical and electro-optical transducers generally require electrical wires to be spaced apart sufficiently enough to avoid crosstalk. For convenience, respective ends of optical fibers in single fiber cables are connected to such transducers by placing them in housings comprising spaced fiber receiving apertures. Another method is to use a two-fiber optical ribbon with a 250 $\mu$m spacing between the fibers whereby the fibers are separated, stripped, and individually connectorized. Both of the foregoing conventional methods are relatively expensive in respect of installation and material costs because two fibers must be individually connectorized.

OBJECTS OF THE INVENTION

In view of the foregoing, it is an object of the present invention to provide a fiber optic ribbon having optical fibers therein, the fibers being spaced apart at a fiber-to-fiber spacing which matches the spacing needed in an electrical system to avoid crosstalk.

It is another object of the present invention to provide a fiber optic cable including a fiber optic ribbon having a fiber-to-fiber spacing which matches the spacing needed in an electrical system to avoid crosstalk.

DETAILED DESCRIPTION OF THE INVENTION

Figure 1:
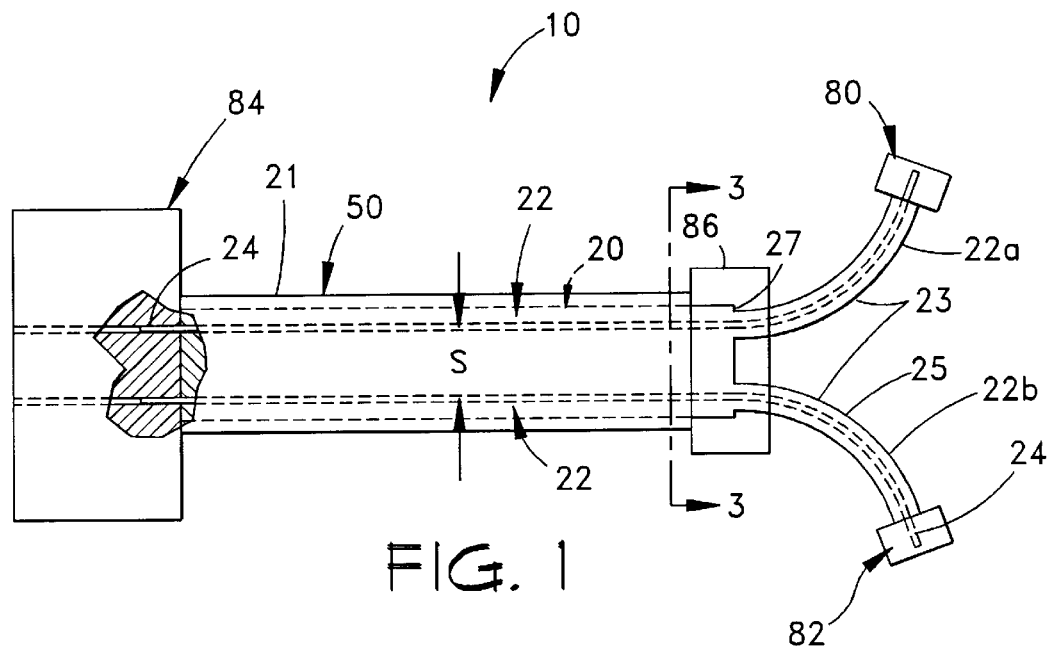
FIG. 1 shows a fiber optic cable assembly including a fiber optic cable according to the present invention.
Figure 2:
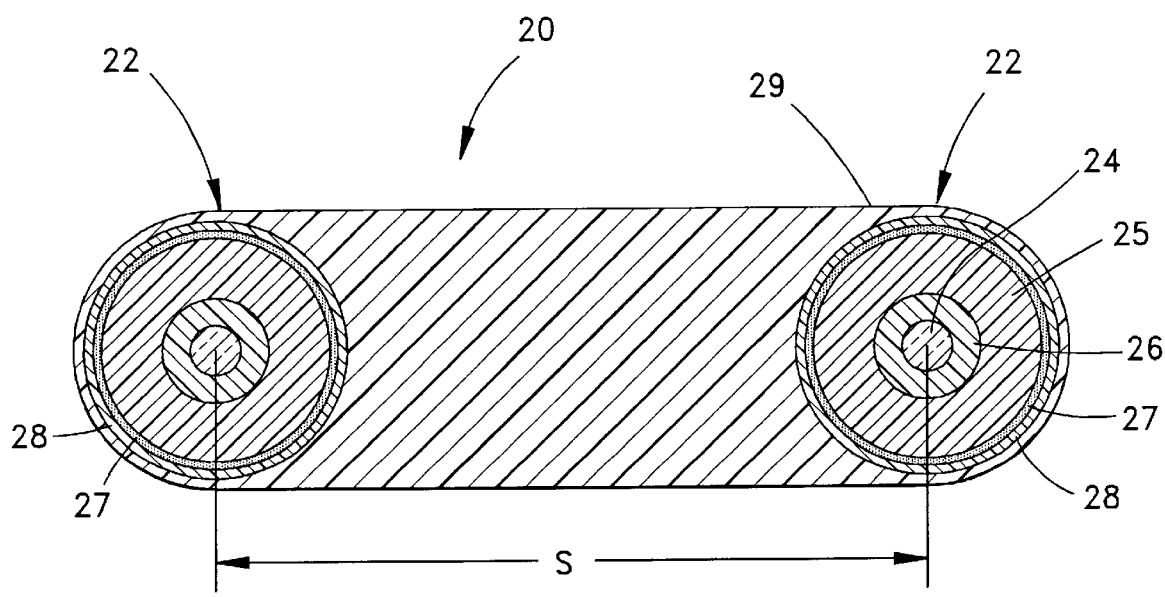
FIG. 2 shows a cross section of a fiber optic ribbon of the fiber optic cable of FIG. 1.
Figure 3:
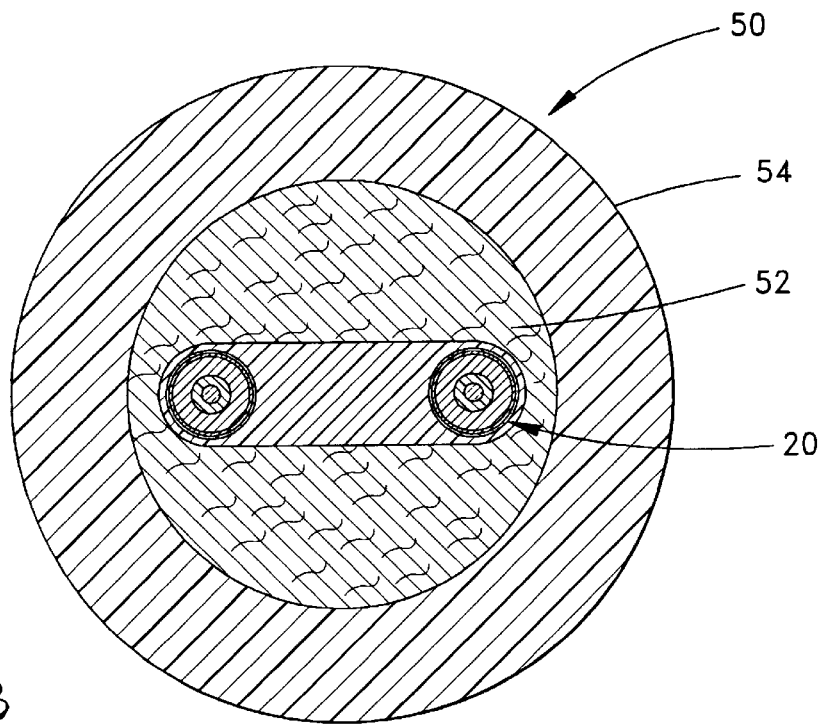
FIG. 3 shows a cross section of the fiber optic cable of FIG. 1 taken across line 3—3.

Referring to FIGS. 1–3, an optical cable 50 according to the present invention, for use in a fiber optic cable assembly 10, will be described. Fiber optic cable assembly 10 comprises conventional single fiber connectors 80 and 82, a conventional dual fiber connector 84, and a fan-out housing 86. Single fiber connectors 80 and 82 may be of the FC Ultra PC type made by the SIECOR™ Corporation of Hickory, N.C. Dual fiber connector 84 is of the type used to interface with, for example, an opto-electrical or electro-optical transducer (not shown). Dual fiber connector 84 is a conventional connector, for example, as disclosed in U.S. Pat. No. 5,214,730, which is hereby incorporated by reference herein in its entirety. Fiber optic cable 50 comprises a fiber optic ribbon 20. Ribbon 20 includes optical fibers 24, a variable spacing section 23, and a transition section 27 inside connector housing 86. Optical fibers 24 are spaced at a nominal fiber-to-fiber distance, herein defined as spacing S. Variable spacing section 23 comprises sub-carrier sections 22a and 22b comprising plastic tubes, e.g. furcation tubing, the spacing of which is variable.

Each carrier section 22 includes an optical fiber 24 with a core and a cladding layer 26 therearound. Cladding layer 26 is surrounded by a protective coating 25. Protective coating 25 is surrounded by an identification ink layer 27. A separation layer 28 is strategically disposed between ink layer 25 and a peelable ribbon matrix layer 29. Separation layer 28 comprises a suitable material, for example, a TBII™ or silicone based material. Matrix layer 29 comprises, for example, a UV curable acrylate material or any suitable thermoplastic material, e.g. a PVC material.

Matrix layer 29 constrains fibers 24 to spacing S. The nominal fiber-to-fiber distance defined by spacing S advantageously comprises an integer multiple of the nominal outside diameter (OD) of the fiber, for example, spacing S would nominally be 500 $\mu$m, 750 $\mu$m, 1000 $\mu$m, or etc. The 750 $\mu$m spacing would permit ribbon 20 to be connectorized to a conventional four fiber connector (not shown).

Separation layer 28 allows a craftsman to remove matrix layer 29 from separation layer 28, whereby sub-carrier sections 22a and 22b are no longer constrained by ribbon matrix layer 29 (FIG. 1). After the peeling operation, ribbon 20 will yet comprise a generally nominal fiber-to-fiber spacing S, which spacing matches the spacing needed in an electrical system to avoid crosstalk. The present invention advantageously permits two fibers 24 to be connectorized in one step. The use of ribbon 20 with a dual fiber connector 84, therefore, reduces installation time and material costs. Sub-carrier sections 22a and 22b, no longer constrained by matrix layer 29, may be variably spaced and individually connectorized to respective connectors 80 and 82.

Ribbon 20 is preferably part of an inside or outside plant optical cable 50 (FIG. 3). Optical cable 50 comprises strength member 52 located about ribbon 20. A jacket 54 surrounds strength members 52. In application, jacket 54 and strength members 52 would be stripped away from variable spacing section 23 so that sub-carrier sections 22a and 22b would extend out of fan-out housing 86 for termination with respective connectors 80,82.

Figure 4:
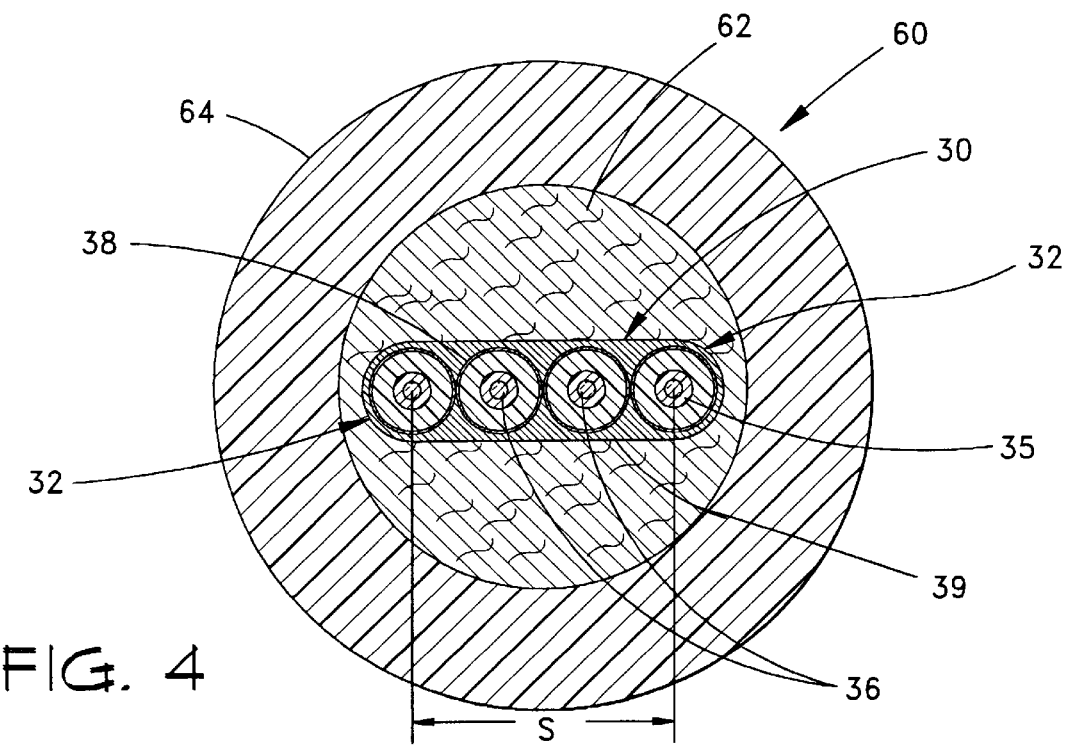
FIG. 4 shows a cross section of a fiber optic cable according to a second embodiment of the present invention.

In a second embodiment of the present invention, a ribbon 30 comprises carrier sections 32 with a separation layer 38 disposed between a ribbon matrix layer 39 and an ink layer 35 (FIG. 4). Spacer fibers 36 are strategically placed between carrier sections 32 thereby defining the desired spacing S between carrier sections 32, as in the first embodiment of the present invention. Ribbon 30 may comprise part of an inside or outside plant optical cable 60. Optical cable 60 comprises strength members 62 located about ribbon 30. A jacket 64 surrounds strength members 62.

Figure 5:
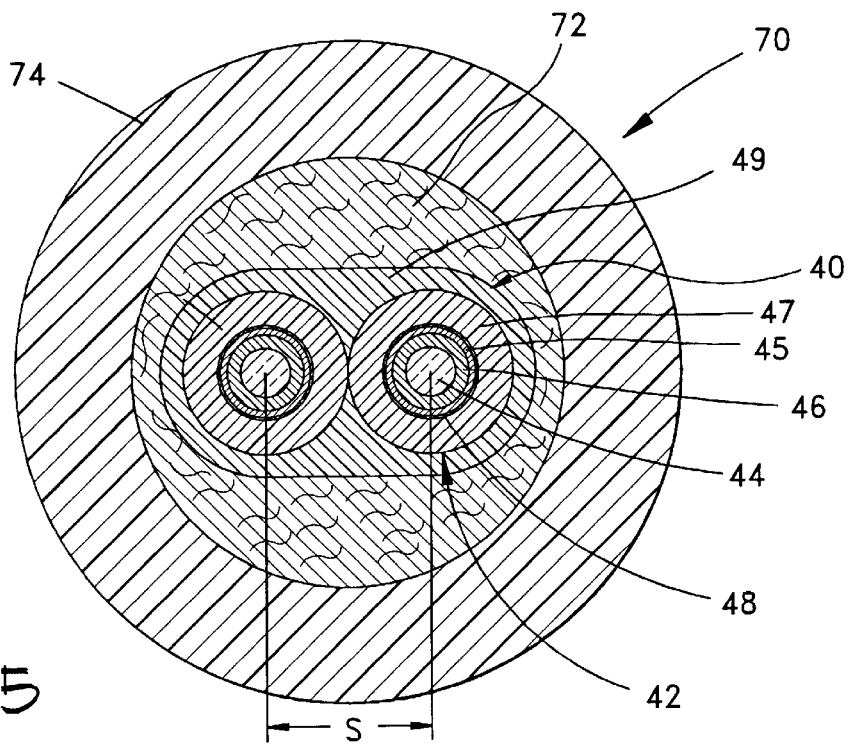
FIG. 5 shows a cross section of a fiber optic cable according to a third embodiment of the present invention.

FIG. 5 shows a third embodiment of the present invention, wherein a fiber optic cable 70 includes carrier sections 42 each having a separation layer 48 between a ribbon matrix layer 49 and an ink layer 45. A protective layer 46 surrounds a glass core and cladding 44. A UV acrylate material 47 is over-coated to a desired diameter thereby spacing fibers 44 at the desired spacing S, as in the first embodiment of the present invention. Ribbon 40 may comprise part of an inside or outside plant optical cable 70. Optical cable 70 comprises strength members 72 which surround ribbon 40. A jacket 74 surrounds strength members 72.

Figure 6:
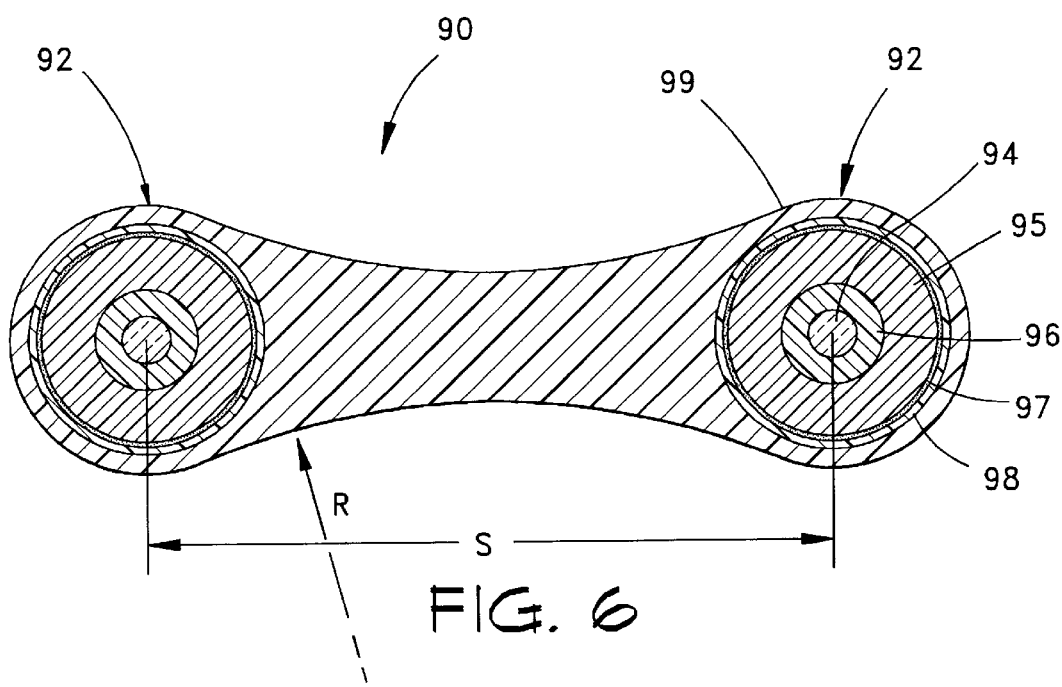
FIG. 6 shows a cross section of a fiber optic ribbon according to a fourth embodiment of the present invention.

FIG. 6 shows a fourth embodiment of the present invention wherein a ribbon 90 comprises carrier sections 92 each having a separation layer 98 disposed between a ribbon matrix layer 99 and an ink layer 97. Cladding 96 surrounds a core 94, and cladding 96 is surrounded by a protective layer 95. Ribbon 90 includes a radius of curvature R, which advantageously lessens the cross sectional area of ribbon matrix 99 between carrier sections 92. The amount of matrix layer material per unit length of cable is also reduced, consequently, the unit cost to produce ribbon 90 may be less as compared to the unit cost of ribbon 20. As in the foregoing embodiments, ribbon 90 may comprise part of an inside or outside plant optical cable.

Figure 7:
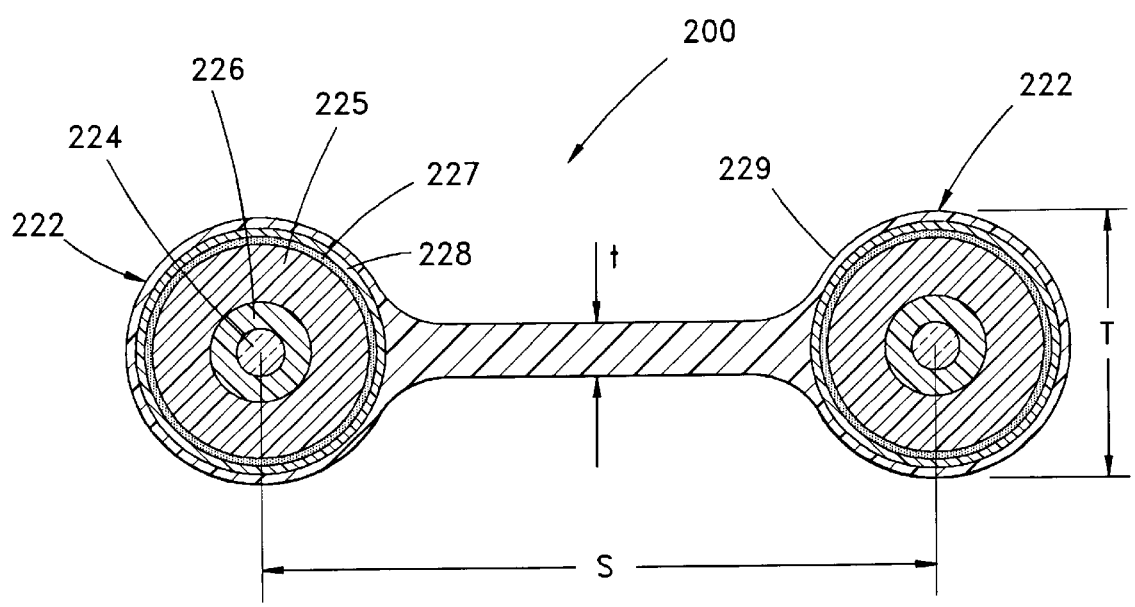
FIG. 7 shows a cross section of a fiber optic ribbon according to a fifth embodiment of the present invention.

FIG. 7 shows a ribbon 200 with carrier sections 222. Each carrier section 222 includes an optical fiber core 224 having a fiber cladding layer 226 therearound. Cladding layer 226 is surrounded by a protective coating 225. Protective coating 225 is surrounded by an identification ink layer 227. A separation layer 228 is strategically disposed between ink layer 225 and a peelable ribbon matrix layer 229. Separation layer 228 comprises a suitable material, for example, a TBII™ or a silicone based material. Matrix layer 229 comprises, for example, a suitable thermoplastic material, e.g. a PVC material. Matrix layer 229 constrains fibers 224 to a spacing S, as in the first embodiment of the present invention. The nominal fiber-to-fiber distance of spacing S is an integer multiple of the nominal outside diameter (OD) of the fiber. A 750 μm spacing advantageously permits ribbon 200 to be connectorized to a conventional four fiber connector (not shown). As in the foregoing embodiments, ribbon 200 may be surrounded by a jacket and strength members. To reduce material costs, a thickness t, medially located between carrier sections 222, is about 15% to 75% of a thickness T of carrier sections 222.

The present invention has thus been described with reference to the foregoing embodiments, which embodiments are intended to be illustrative rather than limiting. Persons of skill in the art will appreciate that variations and modifications of the embodiments may be made without departing from the scope of the appended claims. For example, the fiber optic cables of the present invention are adaptable for use with boots attached to connectors or fan-out housings.

What is claimed is:

1. An optical ribbon comprising:
   optical fibers surrounded by a removable matrix layer; a medial portion of said matrix layer including an arcuate surface having a radius of curvature, said radius of curvature having a center located exteriorly of said optical ribbon, said optical fibers being spaced apart by said matrix layer at a nominal fiber-to-fiber spacing which matches the spacing needed in an electrical system to avoid crosstalk, said fiber-to-fiber spacing comprises an integer multiple of a nominal OD of one of said optical fibers.

2. The optical ribbon of claim 1, wherein said matrix layer being removed from said ribbon allows a variable fiber-to-fiber spacing of said optical fibers.

3. The optical ribbon of claim 1, wherein said radius of curvature lessens the cross sectional area of said matrix layer between said optical fibers.

4. The optical ribbon of claim 1, wherein said fiber-to-fiber spacing is about 750 μm.

5. An optical ribbon comprising:
   optical fibers surrounded by a monolithically formed removable matrix layer, said optical ribbon comprises carrier sections with respective said optical fibers therein, said carrier sections having respective carrier section thicknesses, a medial portion of said ribbon, located between said carrier sections, is at least one optical fiber OD in width and has a thickness of about 15% to 75% of said carrier section thicknesses.

6. The optical ribbon of claim 5, wherein said matrix layer comprises a peelable ribbon matrix layer.

7. The optical ribbon of claim 5, wherein said optical fibers are generally spaced at a fiber-to-fiber spacing comprising an integer multiple of an OD of an optical fiber.

8. An optical ribbon comprising:
   optical fibers surrounded by a monolithically formed removable matrix layer;
   a medial portion of said matrix layer between said carrier sections not including an intermediate optical fiber enclosed in a buffer layer in the range of 500–1000 μm;
   said optical fibers being spaced apart by said matrix layer medial portion at a nominal fiber-to-fiber spacing comprising an integer multiple of a nominal OD of an optical fiber.

9. The optical ribbon of claim 8, wherein said fiber-to-fiber spacing is at least about 500 μm.

10. The optical ribbon of claim 8, wherein said medial portion is at least one nominal optical fiber OD in width and has a thickness of about 15% to 75% of said carrier section thicknesses.

11. The optical ribbon of claim 8, wherein said medial portion is at least one nominal optical fiber OD in width and has a thickness that is generally equal to said thicknesses of said carrier sections.

12. The optical ribbon of claim 8, said medial portion having a generally constant thickness.

13. The optical ribbon of claim 8, said fiber-to-fiber spacing being determined by at least one spacer fiber disposed in said medial portion.

14. The optical ribbon of claim 13, said spacer fiber having a nominal OD of about 250 μm.

15. The optical ribbon of claim 8, said fiber-to-fiber spacing being determined by respective over-coating layers on said optical fibers.

16. The optical ribbon of claim 8, said medial portion having an arcuate profile.

17. The optical ribbon of claim 8, wherein said optical fibers are connected to an optical fiber connector.

18. The optical ribbon of claim 8, wherein strength members are disposed adjacent said optical ribbon.

19. The optical ribbon of claim 8, wherein said optical ribbon is surrounded by a jacket.

20. The optical ribbon of claim 8, said integer multiple resulting in a fiber-to-fiber spacing of at least about 750 μm or less.

21. The optical ribbon of claim 8, said integer multiple resulting in a fiber-to-fiber spacing of at least about 1,000 μm or less.

22. The optical ribbon of claim 8, said integer multiple resulting in a fiber-to-fiber spacing of at least about 250 μm or less.

23. The optical ribbon of claim 8, said integer multiple resulting in a fiber-to-fiber spacing of at least about 500 μm or less.

24. An optical fiber ribbon, comprising:

carrier sections with respective optical fibers therein, said optical fibers include respective coating layers, said coating layers are not in contact with coating layers of other optical fibers;

said optical fibers being spaced apart and surrounded by a monolithically formed matrix layer that defines a medial portion and a nominal fiber-to-fiber spacing, said spacing being an integer multiple of a nominal OD of an optical fiber such that the nominal fiber-to-fiber spacing is greater than the thickness of the optical ribbon.

25. The optical ribbon of claim 24, wherein said nominal fiber-to-fiber spacing range is about 500 μm to 1000 μm.

26. The optical ribbon of claim 24, wherein the thickness of said matrix layer medial portion is generally constant.

27. The optical ribbon of claim 24, wherein the medial portion of said matrix layer is continuous along a line defined between general centers of said optical fibers for defining said fiber-to-fiber spacing.

* * * * *